United States Patent [19]

Thumm et al.

[11] Patent Number: 4,991,474
[45] Date of Patent: Feb. 12, 1991

[54] TOOL TURRET WITH FLEXIBLE CLUTCH

[75] Inventors: Helmut Thumm, Metzingen; Walter Reusch, Dettingen/Erms; Gunther Schips, Metzingen; Willy Sauter, Reutlingen, all of Fed. Rep. of Germany

[73] Assignee: Sauter Feinmechanik GmbH, Fed. Rep. of Germany

[21] Appl. No.: 358,004

[22] Filed: May 26, 1989

[30] Foreign Application Priority Data

May 26, 1989 [DE] Fed. Rep. of Germany ..... 38178737

[51] Int. Cl.[5] .............................................. B23B 29/32
[52] U.S. Cl. .................................... 82/159; 74/813 L; 29/35.5; 29/48.5 R; 464/83
[58] Field of Search ........................ 82/159; 74/813 L; 29/35.5, 48.5 R, 48.5 A; 409/201; 464/74, 83

[56] References Cited

U.S. PATENT DOCUMENTS

| | | | |
|---|---|---|---|
| 4,168,639 | 9/1979 | Ingham et al. | 82/159 |
| 4,379,415 | 4/1983 | Klancnik et al. | 29/48.5 A |
| 4,467,680 | 8/1984 | Kettel | 82/159 |
| 4,468,991 | 9/1984 | Reusch et al. | 74/813 L |
| 4,706,351 | 11/1987 | Chuang | 29/35.5 |
| 4,819,311 | 4/1989 | Hashimoto et al. | 409/201 |

FOREIGN PATENT DOCUMENTS

| | | |
|---|---|---|
| 3143999 | 6/1982 | Fed. Rep. of Germany . |
| 3153112 | 3/1983 | Fed. Rep. of Germany . |
| 123811 | 4/1987 | Fed. Rep. of Germany . |

OTHER PUBLICATIONS

Niemann, Maschinen-Elemente, 1981 pp. 385-390.

Primary Examiner—Frederick R. Schmidt
Assistant Examiner—Mark A. Morris
Attorney, Agent, or Firm—Roylance, Abrams, Berdo & Goodman

[57] ABSTRACT

A tool turret has a locking mechanism part which can be thrust axially relative to the turret head and a control member which is motor powered. The control member is arranged concentric to the rotary axis of the drive shaft of the turret head. The drive shaft is joined inflexibly with the turret head for driving the turret head and is coupled by a flexible clutch or joining device with the control member. A carrier or drive device couples the locking mechanism part with the turret head for concurrent rotation.

21 Claims, 5 Drawing Sheets

TOOL TURRET WITH FLEXIBLE CLUTCH

CROSS-REFERENCE TO RELATED APPLICATIONS

The subject matter of this application is related to U.S. patent application Ser. No. 07/358,005 of Willy Sauter, Helmut Thumm and Erhart Obmann entitled Tool Turret with Rapidly Angularly Adjustable Turret Head, and to U.S. patent application Ser. No. 07/357,518 of Willy Sauter, Helmut Thumm, Gunther Schips and Alfred E. Miller entitled Tool Turret both filed concurrently herewith. The subject matters of both related applications are hereby incorporated herein by reference.

FIELD OF THE INVENTION

The present invention relates to a tool turret including a turret head coupled to a housing for rotation by a motor, first and second annular gears mounted coaxially of the turret head rotary axis and fixed to the turret head and housing, respectively, and a locking mechanism engagable and releasable from the annular gears.

BACKGROUND OF THE INVENTION

In known tool turrets as disclosed in German Patent No. 31 53 112, when the locking mechanism part is in its release position, the turret head is rotatable relative to its drive shaft. Such rotation is required since the turret head is driven by control members.

SUMMARY OF THE INVENTION

An object of the present invention is to provide an improved tool turret in comparison to known turrets.

Another object of the present invention is to provide a tool turret where the turret head is fixed to its shaft.

A further object of the present invention is to provide a tool turret having a flexible clutch coupling the control member to the drive shaft.

The foregoing objects are obtained by a tool turret, comprising a housing, a turret head coupled to the housing for rotation relative to the housing about a rotary axis and fixedly connected to a drive shaft, motor means for rotating the turret head relative to the housing, and first and second annular gears mounted coaxially relative to the rotary axis. The first gear is nonrotatably coupled to the turret head. The second gear is nonrotatably coupled to the housing. A locking mechanism part is axially slidable in the housing relative to the turret head between locking and unlocking positions, and has a third annular gear aligned with the first and second gears and engaging the first and second gears in its locked position. A power driven control member is mounted concentric to said rotary axis. Powered indexing means locks the turret head against rotation relative to the housing after each rotary adjusting movement of the turret head to a desired angular setting, but prior to locking thereof by the locking mechanism part. A flexible clutch couples the control member to the drive shaft. Drive means couples the locking mechanism part and the turret head for simultaneous rotary movement.

The inflexible connection of the turret head to its drive shaft prevents the elements which control the locking member, and also the drive force of the motor, from having to be translated for the rotary drive of the turret head. Since the torques to be translated may be very high, which occurs particularly in the case when the turret head is blocked or becomes dysfunctional as a result of an outside disrupting influence, the elements controlling the locking part are released for the most part by the solution according to the present invention. The forced ruptures which still occur with the known solutions can be avoided absolutely.

However, even those structural components of the solution according to the present invention which must transmit torques between the motor and the turret head are protected from overload. Dangerous torque peaks which occur during impacts or the like are absorbed or attenuated by the flexible clutch or joining device. Thus, it is especially advantageous that the flexible clutch or joining device absorb or attenuate not only the load impacts or surges coming from operation, but especially also those which originate from the turret head, for instance when the turret head or the tools carried in the turret head during a rotary procedural operation contact an obstacle.

Despite the direct drive of the turret head coming from its drive shaft outward, in order to guarantee that the locking mechanism part be rotated along with the assembly as far as is required, the effective carrier or drive device is provided between the turret head and the locking mechanism. Since this carrier or drive device is located on the side of the locking mechanism turned toward the turret head, and thus, on the side turned away from the steering part and control elements, the side turned toward the steering part can be configured exclusively in correspondence with the requirements for control or steering of the axial thrust of the locking mechanism part. It can, for instance, be provided with one or more control cams, serving exclusively to control the axial thrust of the locking mechanism.

The flexible clutch or joining device is advantageously configured as concentric inner and outer rings with mating radially extending gear teeth and with elastic intermediate members between the gear teeth. A configuration of this type can be constructed to take up very little space and also can remain free of disturbance and breakdown.

The connection of the control member with the flexible clutch or joining device can permit limited relative rotation between the control member and clutch. Spring-based bolts can be provided and be held in indentations to guarantee in a simple manner the transmission of the torque produced by the motor onto the drive shaft of the turret head, so long as this member is not yet preindexed. Additionally, such bolts provide the required rotatability of the control member relative to the locking mechanism, when the locking mechanism is held securely by the turret head, and, following each rotation, the realignment of the control member on the flexible clutch device. Above all, the biased bolts function as mechanical brakes, which prevent a runover or overload. Thus, this solution exhibits considerable advantages over the known electromechanical brakes and stop or stroke impact systems.

In one preferred embodiment, the part of the flexible clutch or joining device, which is not connected directly with the drive shaft of the turret head, has indentations required for engaging an indexing bolt. The forces due to inertia arising during any incident involving the indexing bolt are then advantageously picked up by the flexibility of the elastic clutch or joining device, and thus, are considerably attenuated. On the other hand, it is possible to arrange the flexible clutch device adjacent to the partition wall which closes off the housing at the opposite end from the turret head. The drive controlling the indexing bolt, which generally comes from an electromagnet, can then be arranged together with the other electrical components in a chamber defined by a cover and separated completely from the inside of the housing. Thus, disturbing influences can then be completely avoided.

The drive device or carrier device by which the turret head drives the locking mechanism part is preferably configured as spring biased bolts and mating indentations. Driver (carrier) bolts of this type prevent damage or rupture of parts of the tool turret in a simple manner during a collision or overload, if these phenomena occur while the locking mechanism part is in its release position.

Rolls can be provided controlling the axial thrust of the locking mechanism part. The rolls are each mounted rotatably on a radial axis, for instance in the locking mechanism member such that only a single cam race is required for operation. In such case, mounting of the rolls on the locking mechanism part can be provided on the work surface of the control member turned toward or facing the control member.

Instead of having each roll mounted on one axis, barrel rolls can also be provided. Barrel rolls are positioned with a spacer. With barrel rolls of this type, it is generally advantageous to provide both the control member and the locking mechanism part with curved sectors.

In both cases it is advantageous to construct the cam race such that a reversal of the direction of rotation of the control member is not required in order to bring the locking mechanism part back again into its locked position following rotation of the turret head into a new position. For this purpose, all that is required is to configure the cam race or races in such a manner that, even with continued rotational movement of the control member in the same direction, the rolls or the barrel rolls reach the segments of the cam race or races to enlarge the axial spacing between control member and locking mechanism part forcing the locking mechanism part to its locked position. By avoiding a reversal, the time is required to bring the turret head into a new angle position can be shortened. Also, the direction of rotation can be selected so that the new position is attained with the smallest possible angle of rotation.

When the tool turret has a great number of selectable positions for its turret head and/or a high switching velocity is required, as is especially desirable in the case of small tool turrets, the tool turret must be able to dependably execute the control of the locking mechanism following each variation of the rotary setting of the turret head before the subsequent work process. For this purpose, one preferred embodiment has a trip cam and approximation circuit or range setting switch associated with it. Independently of the angle velocity at which the shaft carrying it is rotated and independently of the size of the rotary angle, the trip cam and switch produce a control, reference or check signal at the end of the reversing process causing the locking.

If the attenuation or stabilization attained with the flexible clutch or joining device is not sufficient, the attenuation or stabilization can be further improved with a slight additional outlay by including a second flexible clutch or joining device between the motor and the first flexible clutch. When gearing is present between the motor shaft and the drive shaft, as is generally the case, the second flexible clutch device can be integrated into this gearing, saving space and being cost effective.

Collision protection can be attained with a drive or carrier device between the turret head and locking mechanism part. If this is insufficient, it is possible to select the axial thrustability of the locking mechanism part and of the control member, as well as the axial compression capacity of the loading or biasing compression springs so that, in case of a dangerous collision, the locking mechanism part and the control member are thrust axially away from the turret head to such a distance that the gear assembly of the locking mechanism part comes out of engagement with the annular gear connected with the housing. Thus, the turret head can be rotated relative to the housing for reduction of the collision force effecting it. Since the gear assembly of the locking mechanism part remains in engagement with the annular gear of the turret head after a collision of this sort, the tool turret need not be disassembled for realignment of the locking mechanism part on the turret head. The turret head need only be moved back into the correct position with the aid of the drive mechanism.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
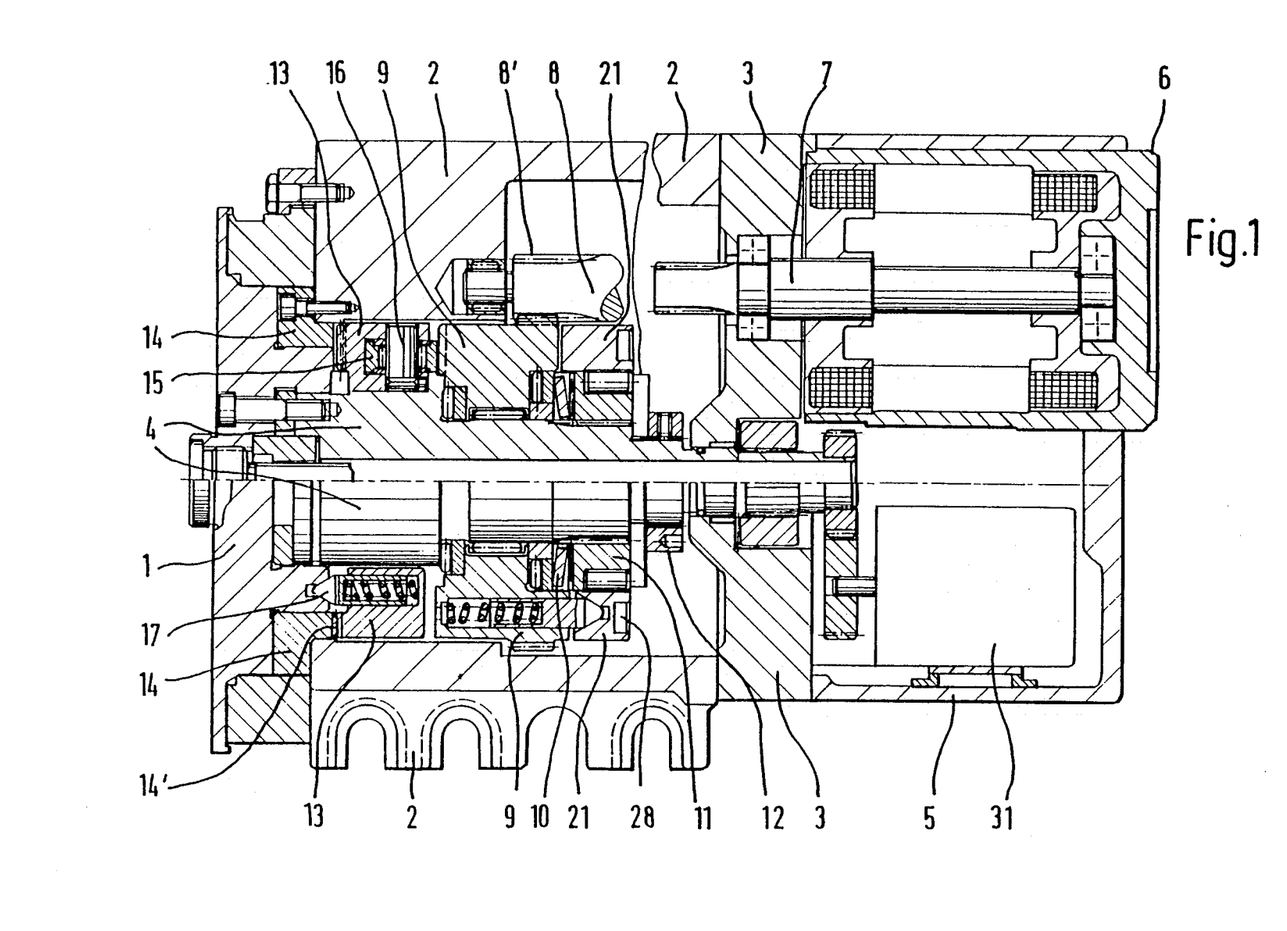
FIG. 1 is a side elevational view in section of a tool turret according to a first embodiment of the present invention.

A tool turret has a turret head 1 extending over one end of a housing 2. The turret head is rotatable relative to housing 2 into different, precisely defined angle settings. A plurality of tool holders can be fastened to turret head 1 in a known manner. Housing 2, which can be secured to a machine tool (not shown), is closed by a partition wall 3 at the end opposite turret head 1. One end of a hollow drive shaft 4 is mounted rotatably in wall 3, and is arranged concentric to the rotary axis of turret head 1. The other end of drive shaft 4 is screwed tightly together with the turret head 1.

A covering cap 5 tightly engages the side of partition wall 3 turned away from housing 2. Cap 5, together with partition wall 3, tightly seals off a space housing all of the electrical component, structural parts of the tool turret, including an a synchronous motor 6. The motor shaft 7 is arranged parallel to drive shaft 4, passes all the way through partition wall 3 in which it is rotatably mounted, and stands with its end projecting into the inner space of housing 2 in gear connection with a reduction gearing. The drive shaft 8 of the reduction gearing is likewise rotatably mounted parallel to drive shaft 4. In the area of the free end of drive shaft 8 in housing 3 such drive shaft has a segment configured as pinion 8'.

Pinion 8' mates with an outside gear of a control member 9 rotatably and axially movable on drive shaft 4. Control member 9 is supported on its working side facing partition wall 3 and thus remote from turret head 1, over a bearing biased at least one cup spring 10 placed on drive shaft 4.

On its opposite side, cup spring 10 is supported on an inside ring 11 of a flexible clutch or joining member. The inside ring 11 is nonrotatably connected by a gear assembly with drive shaft 4. On the working side of inside ring 11 turned away from cup spring 10, with interposition of an annular washer, inside ring 11 is supported on a thrust ring 12 screwed onto drive shaft 4. This thrust ring 12 lies directly adjacent to partition wall 3.

An annular locking mechanism part 13 is arranged between control member 9 and the diminished diameter end segment of turret head 1 projecting into housing 2. Locking mechanism part 13 is rotatable on drive shaft 4 and is axially thrustable. The side of part 13 facing turret head 1 is provided with axial gear teeth 13' (FIG. 2) forming a third annular gear. Axial gear teeth 1' of corresponding configuration are provided on the working surface of turret head 1 facing locking mechanism part 13, and form a first annular gear. Axial gear teeth 14', of identical configuration to gear teeth 1', are provided on the working surface of a face gear 14 facing locking mechanism part 13, form a second annular gear. Face gear 14 is connected securely with housing 2 and engages in the diminished diameter end segment of turret head 1. The surface of turret head 1 facing locking mechanism part 13 is aligned with the corresponding surface of gear 14. The two sets of gear teeth 1' and 14' are ground and shaped together, since they serve together with gear 13' of locking mechanism part 13 to position turret head 1 very precisely in the angle settings as selected. Cup spring 10 produces the force pressing gear 13' inward until locking mechanism part 13 has reached its locked position in engagement with gear teeth 1' and 14'.

Rolls 15 control the axial thrust of locking mechanism part 13. The rolls are mounted rotatably on radially extending journals 16 distributed uniformly around the periphery of locking mechanism part 13, inside locking mechanism part 13, and extend the same distance from the surface of locking mechanism part 13 facing control member 9.

Blind-end boreholes are provided in locking mechanism part 13 and penetrate into the intermediate spaces between journals 16 from the side of part 13 facing turret head 1. In each borehole a drive or carrier bolt 17 is longitudinally movable mounted and is spring biased. The end segment of this carrier bolt 17 extending from locking mechanism part 13 is conical. The cone angle is greater than the cone angle of the automatic locking range. A conical bore 18 penetrates into turret head 1 and is adapted to the shape of carrier bolt 17. The cone angle of bore 18 mates with the cone angle of the end of the carrier bolt. These conical bores 18 are each located in an indentation 19.

Carrier bolts 17 and conical bores 18 together form a carrier arrangement so that during rotary movement of turret head 1, the locking mechanism part 13 is carried along with it. Since carrier bolts 17 are pressed incompletely out of the relevant conical bores 18 when the torque to be transmitted exceeds a top limit, damage or rupture in case of a collision or overload can be avoided by this force-locking cam arrangement. In such a case, if carrier bolts 17 have been forced out of conical bores 18, they then automatically return to their starting position. However, if the carrier bolts are completely forced out, then conical bores 18 need only be realigned with carrier bolts 17, because the lift of carrier bolts 17 is limited to a degree which prohibits carrier bolts 17 from being able to be forced out of their respective indentations.

If the amount by which the effective axial length of cup spring 10 can be reduced by application of a comprehensive load in case of a collision is sufficient for gear 13' of locking mechanism part 13 to become unmated and pop out of gear teeth 1' or 14', carrier bolts 17 and bores 18 are not necessary for collision protection. In case of collision, however, the carrier bolts and the mating bores can prevent turret head 1 from being rotated relative to locking mechanism part 13 so far that these parts can no longer be brought back directly and without intervention into their original or precollision angle setting.

Figures 2, 3:
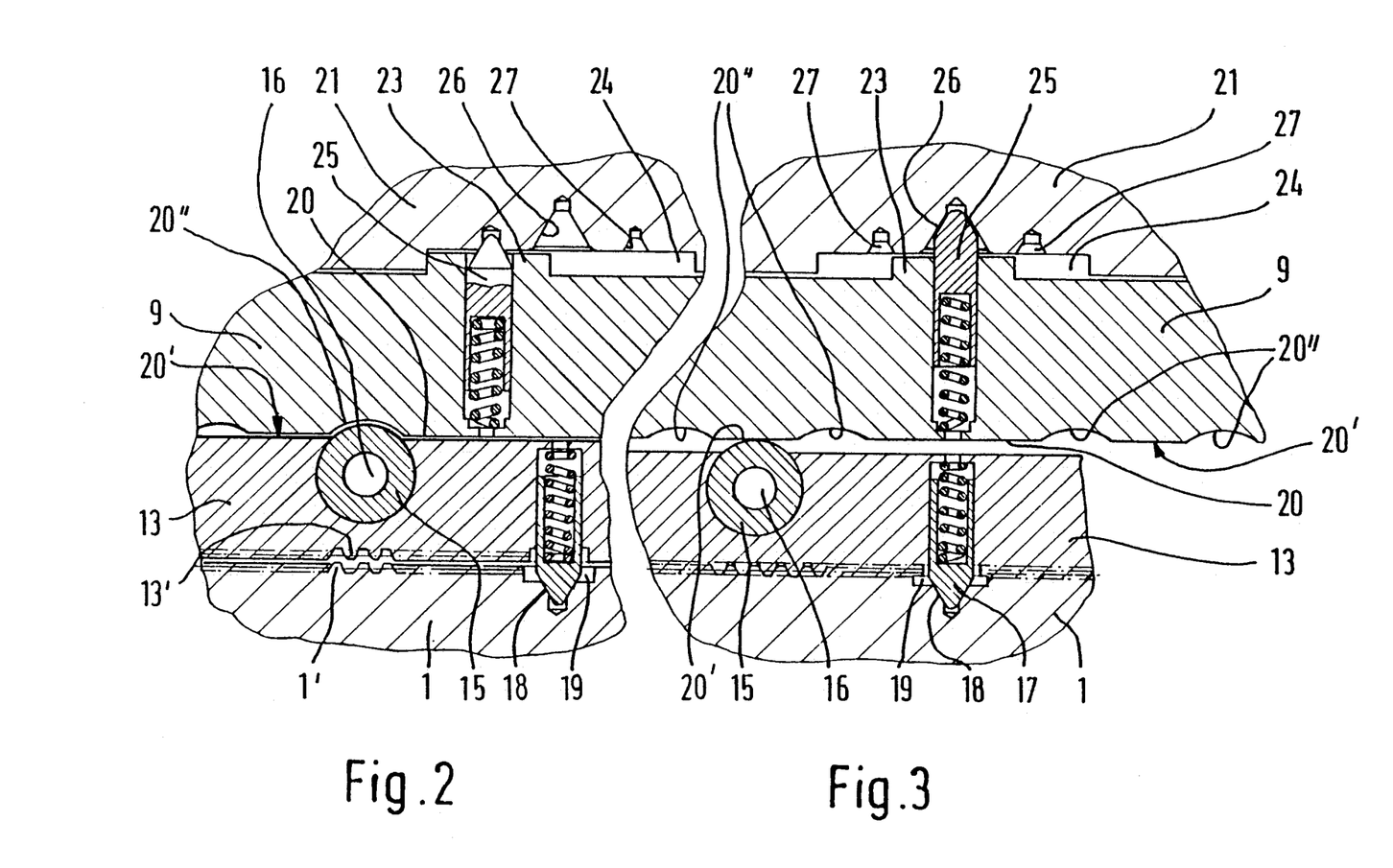
FIG. 2 is a partial plan view in section along a cylindrical surface concentric to the longitudinal axis of the first exemplary embodiment through the turret head, the locking mechanism part, the control member and the flexible clutch or joining device with the locking mechanism part in its release or unlocking setting.
FIG. 3 is a partial plan view in section, similar to FIG. 2, but with the locking mechanism part in its locked setting.

On its working surface facing locking mechanism part 13, as shown in FIGS. 2 and 3, control member 9 has an annular cam race extending over the entire periphery of the working surface. The cam race serves as roller path for rolls 15. The roller path includes flat segments 20 and 20' lying in a radial plane, following one after the other alternately in sequence around the periphery. An indented or recessed segment 20" lies between each two adjacent flat segments. The indented segments are configured with a curve adapted to the curvature of the cylindrical outside surface of rolls 15.

When rolls 15 lie on one of the flat segments 20', the locking mechanism part 13 is located in its locked setting, in which gear 13' is in engagement without any play with gear teeth 1' and 14', as shown in FIG. 3. When rolls 15 engage completely in the indented segments 20", as shown in FIG. 2, locking mechanism part 13 is located in its release setting, in which its gear 13' completely releases gear teeth 1' and 14'. Since the roller path is attached adjacent to each side of each indented segment 20", the roller path being in the form of one of the flat segments 20 or 20', the rotation of turret head 1 into a new position can occur as desired in one or the other direction of rotation. In one corresponding construction of the tool turret, control member 9 could be further rotated in the same or the opposite direction, in order to bring locking mechanism part 13 into its locked position after the new position has been reached.

Figure 5:
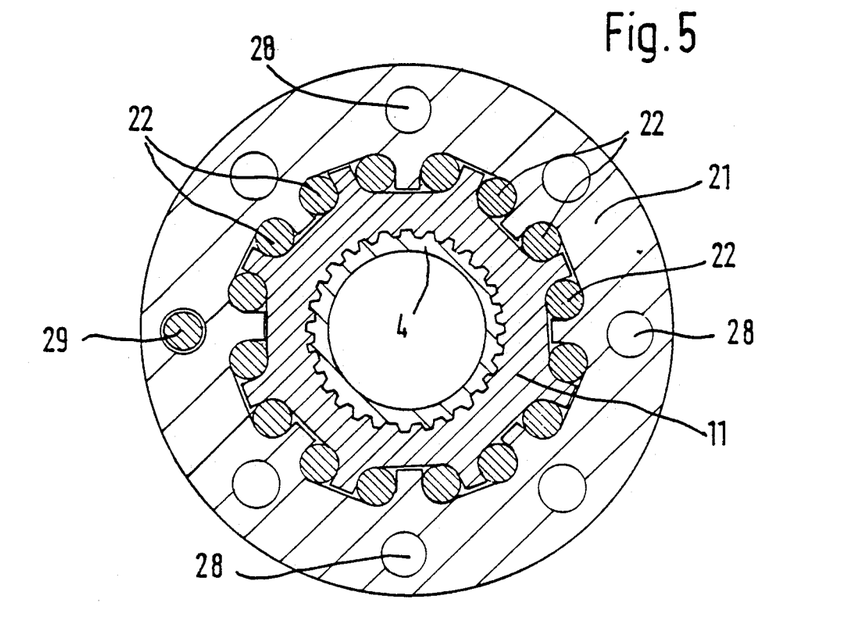
FIG. 5 is a front elevational view in section of the flexible clutch or joining device and its bores for the indexing bolt, of the tool turret of FIG. 1.

An outside ring 21 concentrically surrounds inside ring 11 of the flexible coupling or joining device. As shown in FIG. 5, outside ring 21 is provided with a radially extending, inside gear assembly. The inside ring has a corresponding, radially extending outside gear assembly. The interstices between each two adjacent teeth in either gear assembly are configured so that the tooth of the other gear assembly engaging in..the interstice subdivides the interstice into two at least almost cylindrical spaces. In each space a rod-like attenuating or stabilizing element 22 of a rubber-elastic material is located and fills the space without any play. As with a flexible clutch, these attenuating or stabilizing elements 22 allow a certain degree of rotation of outside ring 21 relative to inside ring 11 in both directions. Thus, this clutch device can attenuate or absorb sudden impacts or charges coming both from the direction of a synchronous motor 6 toward turret head 1 and also from the opposite direction. This is also advantageous during preindexing when relatively large masses are brought abruptly to a standstill.

Figure 6:
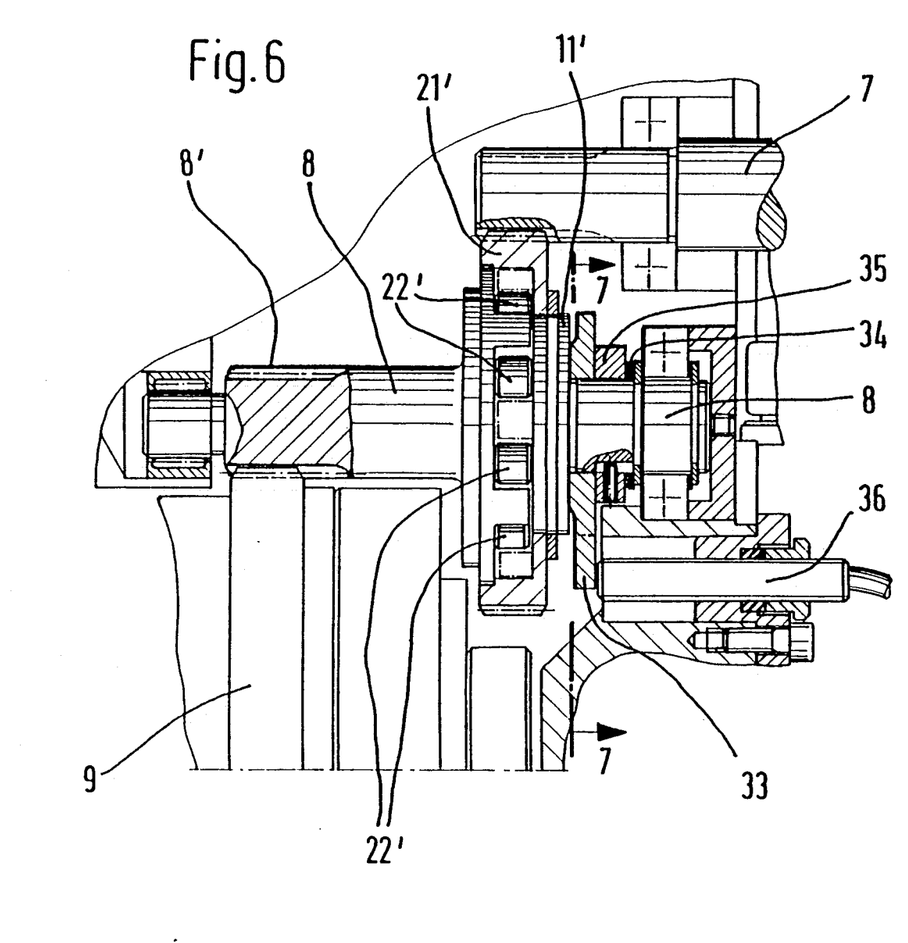
FIG. 6 is an enlarged, partial side elevational view in section through a part of the first exemplary embodiment which is not visible in FIG. 1.

An additional flexible clutch or joining device of corresponding construction connects motor shaft 7 with drive shaft 8. The one part of this clutch or joining device, as shown in FIG. 6, is an outside ring 21' having a radially extending outside gear assembly which mates with a pinion on motor shaft 7. Outside ring 21' has a gear assembly on its inside configured identically to the inside gear assembly of outside ring 21. The other part of the clutch or joining device is formed of an inside ring 11' mounted securely and fixedly on the drive shaft. Outside ring 21' is mounted about inside ring 11', and is rotatable but is axially immovable relatively to inside ring 11'. Inside ring 11' is provided with a radially extending outside gear assembly identical to that of inside ring 11. Between the mating gear teeth of both rings, roller-shaped attenuating or stabilizing elements 22' are arranged and support the gear teeth without any play one relative to the other.

As shown in FIGS. 2 and 3, control member 9 has axially projecting pawls 23 on its working side facing outside ring 21. Each pawl engages in a groove 24 of outside ring 21. Pawls 23 and grooves 24 have flanks lying in radial planes, so that a form-locking clutch or joining device is formed when a pawl 23 engages one or the other flank of the associated groove 24. As shown in FIGS. 2 and 3, the breadth of grooves 24 measured peripherally is greater than the corresponding breadth of pawls 23 by such a degree that, starting from an orientation of pawls 23 in the middles of the associated grooves 24, corresponding to a position in which each roller 15 rests in the middle of one of the flat segments 20', each pawl 23 can be thrust in one direction or the other direction relative to the respective groove 24 to such a distance that rolls 15 come into complete engagement with the indented segments 20''. In this position, each pawl 23 lies against one flank of the respective groove 24.

A plurality of centering bolts 25 are provided as replacement for a mechanical brake, a special stop or a stroke impact element. The bolts are mounted in and longitudinally movable in bores oriented parallel to drive shaft 4. The bores extend inwardly, from the working or free end surface of each pawl 23 into control member 9. A spring loads each centering bolt 25 to bias it against outside ring 21. The end segment of each centering bolt 25 extending beyond pawl 23 is conical. The cone angle of each bolt end segment is greater than the cone angle of the automatic locking range. A conical bore 26 is provided in the middle of each grove 24. The cone angle of each bore 26 is adapted to the cone angle of the associated centering bolt 25, which engages conical bore 26 when pawl 23 is aligned in the middle of groove 24. A shorter conical bore 27 is located in the base of each groove for engagement of the relevant centering bolt 25 in both end positions, in which pawl 23 engages on one or the other flank of groove 24.

Centering bolts 25 replace a stop or an electromagnetic brake. Additionally, during a relative movement between control member 9 and outside ring 21, the centering bolts prevent a runover or overload outward over the middle setting, since centering bolts 25 and conical bores 26 operate in coordination with each other by virtue of their conical shape.

Figure 4:
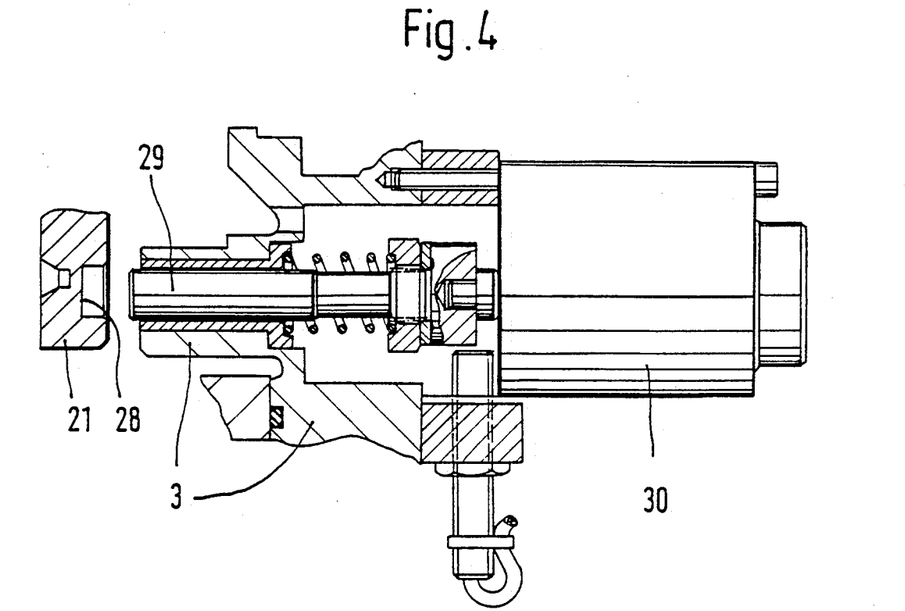
FIG. 4 is a partial side elevational view in section through the flexible clutch or joining device and the partition wall, as well as a side view of the indexing bolt and its drive, of the tool turret of FIG. 1.

On its working side turned away from control member 9, outside ring 21 has blind-end bores 28 for receiving an indexing pin 29. Pin 29 extends parallel to drive shaft 4 and is longitudinally movable through partition wall 3. Its electromagnetic drive 30 is located within covering cap 5, and thus, is protected from outside influences. A rotary remote-position indicator 31 is arranged within covering cap 5 is connected with drive shaft 4 by gear wheels, and produces the signals characterizing the angle setting of turret head 1.

If the angle setting of turret head 1 is to be modified, a synchronous motor 6 is connected in that direction of rotation in which turret head 1 attains its new angle position over the shortest path. Since locking mechanism part 13 is initially in its locked position, the connection of a synchronous motor 6 results only in a rotary movement of control member 9. Drive shaft 4 is still stationary. As a result of the rotary movement of control member 9, rolls 15 move from the middle of the flat segments 20' to the middle of the indented segments 20', allowing the locking mechanism part 13 to be thrust into its release setting.

The initial rotary movement of control member 9, also causes centering bolts 25 to be brought out of their associated conical bores 26 and catch in one of the conical bores 27, when pawls 23 are positioned on the one flank of groove 24. This is the case when rolls 15 reach the middle of of indented segments 20''. Since the rotary movement of control member 9 continues, drive shaft 4 then rotated together with turret head 1. Thus, carrier or drive bolts 17 carry along or drive locking mechanism part 13.

As soon as the new angle setting of turret head 1 is reached, a corresponding signal to that effect is emitted from rotary setting indicator 31, activating electromagnetic drive 30 bringing indexing pin 29 into engagement with the blind-end bore 28 associated with this angle position. As a result of this engagement, drive shaft 4 and turret head 1 are blocked. Synchronous motor 6 is simultaneously disconnected. As a result of the reconnection of a synchronous motor 6 in a reverse direction of rotation, control member 9 is rotated back into the startling position in which centering bolts 25 engage in conical bores 26. Locking mechanism part 13 is then thrust into its locked position. When this locked position is reached, a synchronous motor 6 is disconnected.

Figure 7:
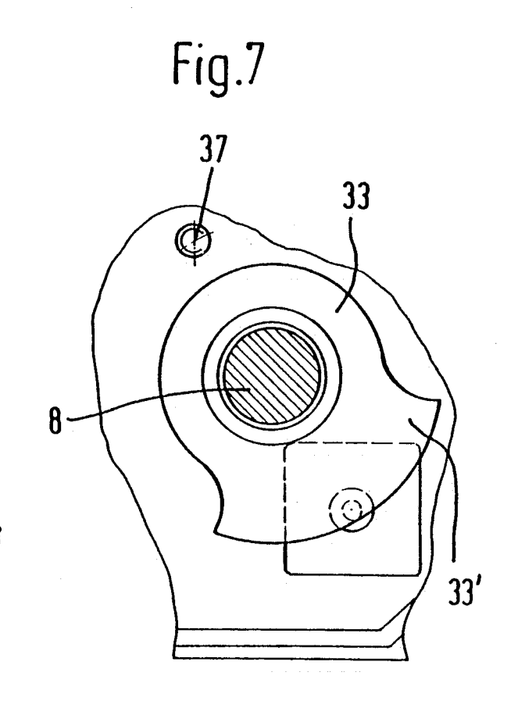
FIG. 7 is an elevational view in section taken along line 7—7 of FIG. 6.

A trip cam 33 is arranged rotatably on drive shaft 8 to produce a control or monitoring signal for the locking mechanism part. The control is generated only during reverse operation when control member 9 is turned back into its locked position. Trip cam 33 presses a spring 34 with interposition of a ring 35 onto one working surface of inside ring 11'. As shown in FIG. 7, trip cam 33 has a radial protrusion 33' serving as switching or actuating part and extending over an angle of approximately 90 degrees. Parallel to drive shaft 8, an approximation switch 36 is mounted stationarily in an aperture in partition wall 3, so that at a slight distance from it protrusion 33' can skirt the sensor surface formed by its working surface. Diametrically or 180 degrees opposite approximation switch 36, a stop or stroke impact bolt 37 projects into the movement wedge space of projection 33'.

When turret head 1 is located in one of its alternate angle settings, the sensor surface is aligned with the middle of projection 33', as shown in FIG. 7. When turret head 1 need be rotated around only a very small angle in one or the other direction, on account of the reduction gearing, the motor shaft undergoes a rotation of more than 180 degrees. On account of the friction contact between trip cam 33 and inside ring 11', the trip cam is thus carried along until it abuts on stop bolt 37. During the reversing movement required for the locking mechanism, trip cam 33 is carried along and back again into its starting position. Thus, protrusion 33' comes into the operational area of approximation switch 36, so that this switch produces a signal which establishes that turret head 1 is locked once again. This locking mechanism control works reliably even with very small rotary angles of the turret head, such as may arise if there are sixteen and more positions, and with very high adjustment velocities.

Insofar as pawls 23 are relinquished and conical bores 27 are configured so that centering bolts 25 engaging in them can transfer the torque required for rotation of turret head 1 without being raised out of conical bores 27, it would also be possible, without any reversal of a synchronous motor 6, to bring locking mechanism part 13 back into its locked position.

Figure 8:
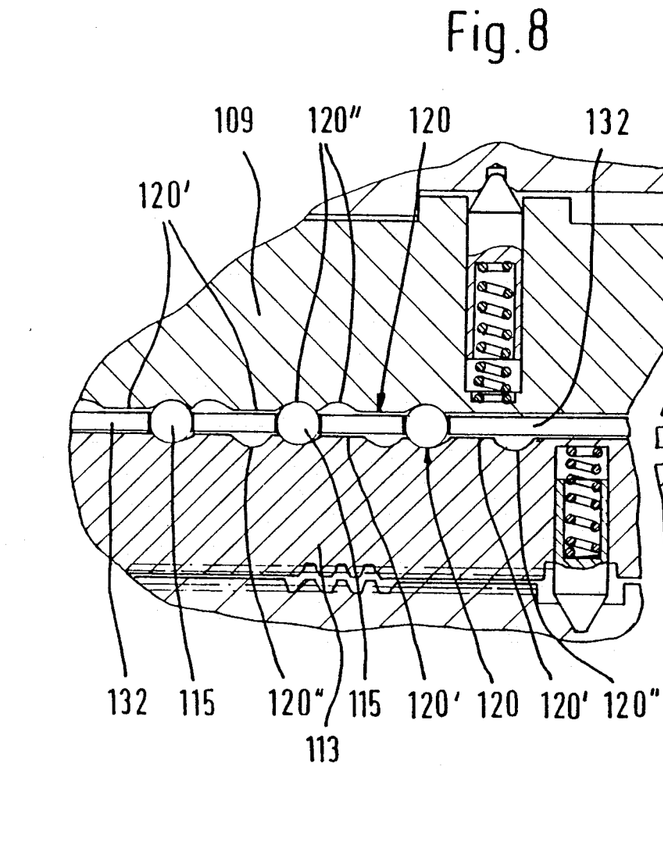
FIG. 8 is a partial plan in section, similar to FIG. 2, but of a tool turret according a second embodiment of the present invention.
Figure 9:
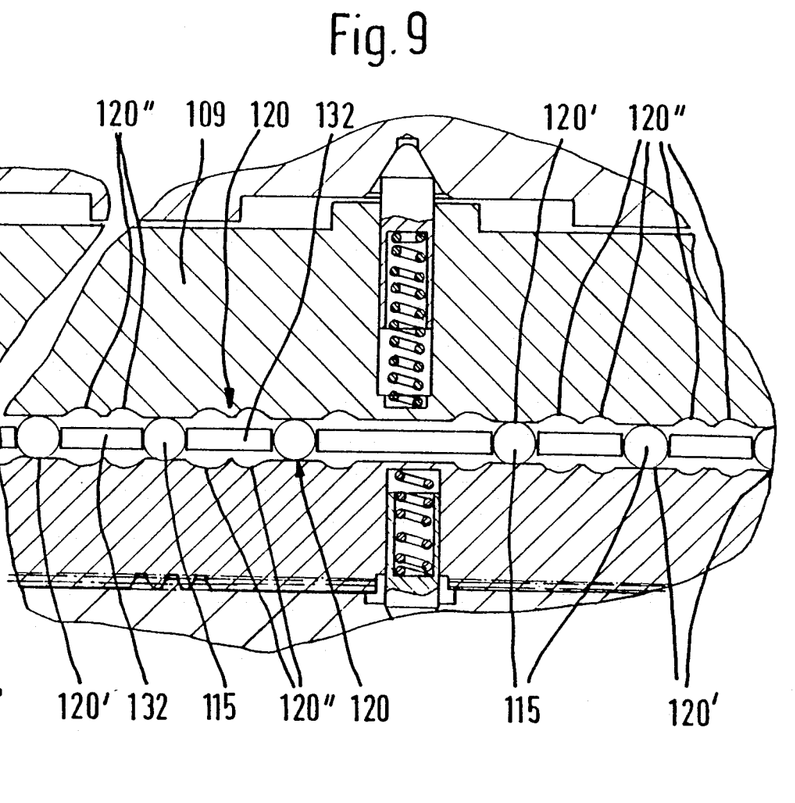
FIG. 9 is a partial plan view in section, similar to FIG. 3, but of the second exemplary embodiment.

The second exemplary embodiment, shown in FIGS. 8 and 9, differs from the first exemplary embodiment only in the elements controlling the axial movement of its locking mechanism part 113. Thus, the second embodiment is described only in terms of its general configuration. Reference is made to the description the first exemplary embodiment of the further individual features.

As shown in FIGS. 8 and 9, control member 109 is provided with a curved sector on the working surface turned toward locking mechanism part 113. The cam race has flat segments 120 and 120' lying in a radial plane. Between each adjacent pair of flat segments, indented segments 120", are provided. The flank of the indented segment 120" engaging with one of the flat segments 120 or 120' has a smaller inclination than the other flank. An identically constructed mirror-image cam race is provided on the working surface of locking mechanism part 113 facing control member 109. The two curved sectors are aligned with each other.

Instead of the rolls 15 of the first exemplary embodiment, cylindrical barrel rolls 115 are provided in the second embodiment. The outside contour of rolls 15 in cross section is adapted substantially to the indented segments. Each cylindrical barrel roll 115 is arranged without any play in a rectangular cut out in a plate-like spacer 132. Spacer 132, as shown in FIGS. 8 and 9, lies between control member 109 and locking mechanism part 113 at some distance from flat segments 120 and 120' of the two cam races.

While various embodiments have been chosen to illustrate the invention, it will be understood by those skilled in the art that various changes and modifications can be made therein without departing from the scope of the invention as defined in the appended claims.

What is claimed is:

1. A tool turret comprising:
   a housing;
   a turret head coupled to said housing for rotation relative to said housing about a rotary axis, said turret head being fixedly connected to a drive shaft;
   motor means for rotating said turret head relative to said housing;
   first and second annular gears mounted coaxially relative to said rotary axis, said first gear being nonrotatably coupled to said turret head, said second gear being nonrotatably coupled to said housing;
   a locking mechanism part axially slidable in said housing relative to said turret head between locking and unlocking positions, said locking mechanism part having a third annular gear aligned with said first and second gears and engaging said first and second gears in said locked position;
   a power driven control member mounted concentric to said rotary axis;
   powered indexing means for locking said turret head against rotation relative to said housing after each rotary adjusting movement of said turret head to a desired angular setting, but prior to locking thereof by said locking mechanism part;
   a flexible clutch coupling said control member to said drive shaft and being flexible in directions of rotation;
   drive means coupling said locking mechanism part and said turret head for simultaneous rotary movement.

2. A tool turret according to claim 1 wherein said flexible clutch comprises a first part nonrotatably coupled with said drive shaft and a second part rotatably driven by said first part through elastic intermediate members.

3. A tool turret according to claim 2 wherein said first and second parts comprise first and second rings, respectively, one of said rings being arranged concentrically in the other of said rings, said rings having mating, radially extending gear teeth, said elastic intermediate members being arranged between said gear teeth of said rings.

4. A tool turret according to claim 2 wherein said indexing means comprises an indexing 29 and mating indentations in said second part of said flexible clutch for receiving said indexing bolt.

5. A tool turret according to claim 4 wherein said housing comprises a cover on an end thereof remote from said turret head and a cap attached to said cover on a side thereof remote from said turret head, said cap receiving electromagnet means for driving said indexing bolt; and said flexible clutch being mounted in said housing adjacent said cover.

6. A tool turret according to claim 5 wherein said cap and said cover define a closed space which houses remote position indicator means for generating signals in response to certain turret head positions, a portion of said motor means and other electrical components.

7. A tool turret according to claim 1 wherein said control member is coupled to said flexible clutch by a form-locking, first carrier means having a lost motion sector for permitting relative rotation between said control member and said flexible clutch in both rotational directions through a preset angle.

8. A tool turret according to claim 7 wherein said control member is coupled to said flexible clutch by a force-locking second carrier means having at least one spring-biased centering bolt mounted in one of said control member and said flexible clutch and having at least one indentation in the other of said control member and said flexible clutch, said centering bolt being received in said indentation in one rotary position of said control member and said flexible clutch.

9. A tool turret according to claim 8 wherein said indentation comprises a conical section tapering in a direction away from said centering bolt with a cone angle greater than a cone angle of automatic locking; and said centering bolt has a free end segment having a mating conical shape to said conical section.

10. A tool turret according to claim 9 wherein said indentation comprises conical parts with a cone angle greater than cone angles of automatic locking positioned to receive said centering bolt in two positions of said control member corresponding to the unlocking position of said locking mechanism part.

11. A tool turret according to claim 1 wherein said drive means comprises at least one spring biased drive bolt mounted in one of said locking mechanism part and said turret head and at least one mating indentation in the other of said locking mechanism part and said turret head.

12. A tool turret according to claim 11 wherein said indentation is conical along at least part of its length and opens outwardly with a cone angle greater than a cone angle of automatic locking; and said drive bolt includes a free end segment having a mating conical shape to the conical indentation.

13. A tool turret according to claim 1 wherein said control member is mounted adjacent said locking mechanism part at a side thereof remote from said third annular gear, and comprises a cam race on a side thereof facing said locking mechanism part; and said locking mechanism part comprising rollers supported thereon and engaging said curved sector.

14. A tool turret according to claim 13 wherein said rollers comprise ring rolls rotatably mounted on radially extending journals on said locking mechanism part.

15. A tool turret according to claim 13 wherein said rollers comprise barrel rolls; mounted in a spacer freely rotatable between said control member and said locking mechanism part.

16. A tool turret according to claim 15 wherein said locking mechanism part comprise,,s a cam race on a side thereof facing said control member aligned, and symmetrical to said cam race of said control member.

17. A tool turret according the claim 13 wherein said cam race has a shape forcing said locking mechanism part into the locking position by continued rotation of said control member relative to said locking mechanism part in a direction of preceding rotation of said control member.

18. A tool turret according to claim 1 wherein said motor means comprises a motor shaft supporting and driving a trip cam of an approximation circuit by a frictional coupling during rotation of said turret head through a certain angle, said trip cam being rotatable from an activating position in two directions to deactivating positions, rotation of said trip cam in either direction being limited by a stop to an angle of less than 180 degrees.

19. A tool turret according to claim 1 wherein said motor means and said flexible clutch are coupled by a second flexible clutch.

20. A tool turret according to claim 19 wherein said second flexible clutch comprises a first member fixedly mounted on a main drive shaft and a second member concentrically surrounding said first member, said second member having an outside gear mating with a pinion on a motor shaft.

21. A tool turret according to claim 1 wherein said locking mechanism part and said control member are biased by a compression spring toward said locking position, and are movable against biasing of said compression spring through a distance greater than an engagement depth of said third annular gear in said second annular gear.

* * * * *

UNITED STATES PATENT AND TRADEMARK OFFICE
CERTIFICATE OF CORRECTION

PATENT NO. : 4,991,474

DATED : February 12, 1991

INVENTOR(S) : Helmut THUMM et al.

It is certified that error appears in the above-identified patent and that said Letters Patent is hereby corrected as shown below:

On the title page,

"[30] Foreign Application Priority Data

May 26, 1989 [DE] Fed. Rep. of Germany ..... 38178737"

should read

--[30] Foreign Application Priority Data

May 26, 1988 [DE] Fed. Rep. of Germany ..... 38178737--; and

"FOREIGN PATENT DOCUMENTS 3143999  6/1982  Fed. Rep. of Germany.
3153112  3/1983  Fed. Rep. of Germany.
 123811  4/1987  Fed. Rep. of Germany."

should read

--FOREIGN PATENT DOCUMENTS 3143999  6/1982  Fed. Rep. of Germany.
3153112  3/1983  Fed. Rep. of Germany.
1238311  4/1987  Fed. Rep. of Germany.--

Signed and Sealed this

Seventh Day of July, 1992

*Attest:*

DOUGLAS B. COMER

*Attesting Officer*     *Acting Commissioner of Patents and Trademarks*